Fig. 3

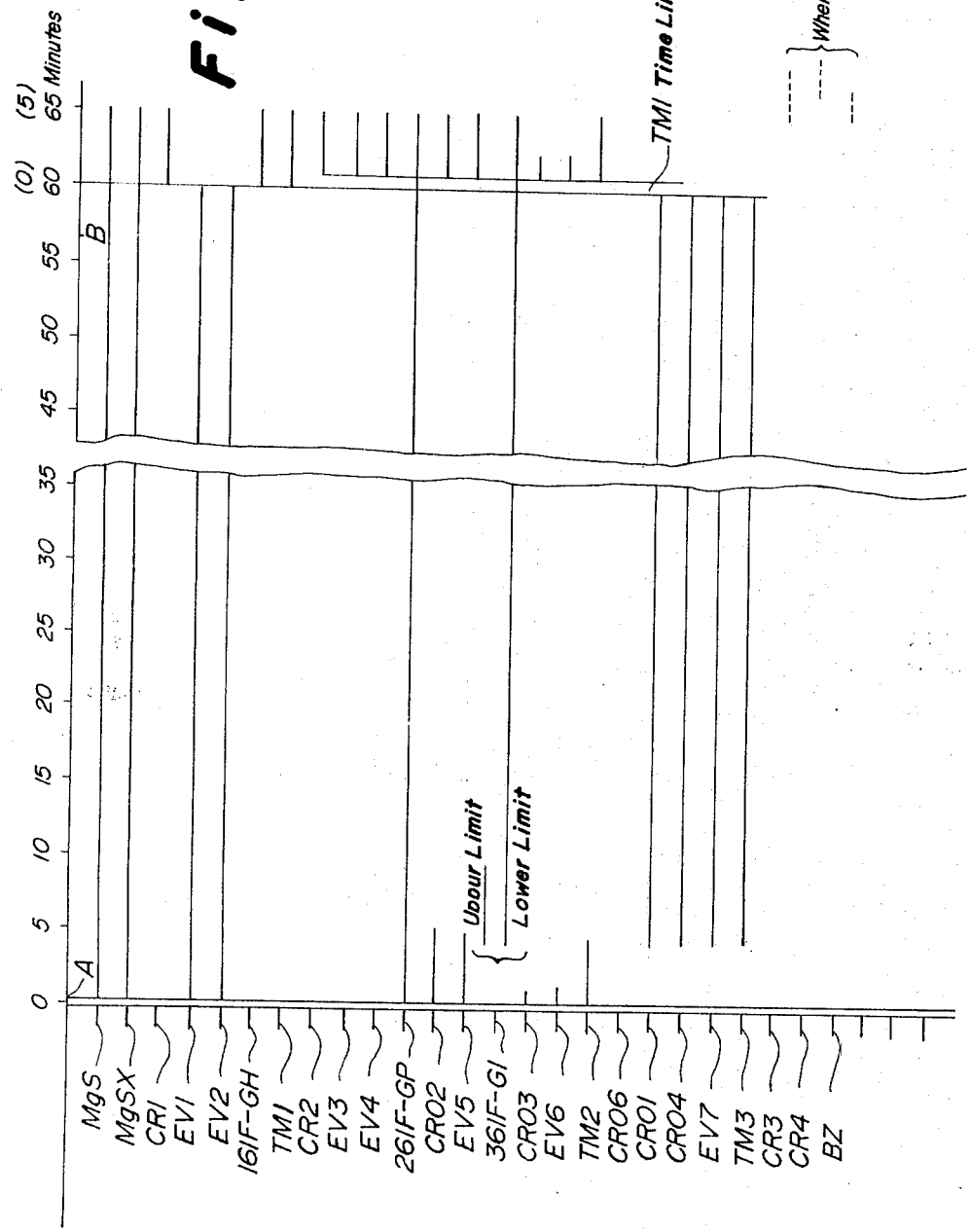

United States Patent Office 3,826,718
Patented July 30, 1974

3,826,718
APPARATUS FOR AUTOMATICALLY EFFECTING VACUUM CONCENTRATION AND RECOVERY OF WASTE LIQUID
Kiyosumi Takayasu, 2, 5-chome, Horita-Dori, Mizuho-ku, Nagoya, Japan
Filed Mar. 23, 1973, Ser. No. 343,952
Claims priority, application Japan, Mar. 25, 1972, 47/29,393
Int. Cl. B01d 1/00, 3/00, 3/42; F28b
U.S. Cl. 202—181                                    1 Claim

ABSTRACT OF THE DISCLOSURE

An apparatus for automatically effecting vacuum concentration and recovery of waste liquid comprising an evaporating vessel of which volume is relatively small and which is provided on its top with a steam riser tube which is occupied by a vapor separator and a condenser. The condenser is subjected through a drain tank consisting of two tanks connected in series, to vacuum. A waste liquid in a waste liquid recovery tank is supplied into the evaporating vessel and is heated by a steam heater and steam thus produced is condensed into distilled water by the condenser, the distilled water being discharged through the drain tank to the outside. The liquid level in the evaporating vessel, water level in the drain tank and liquid level in the waste liquid recovery tank are controlled by relays arranged on a control board in a manner such that the evaporating and concentrating operations of the waste liquid and discharge of distilled water are automatically repeated for a given number of times. The starting and stop of these automatic operations are manually effected.

This invention relates to an apparatus for automatically effecting vacuum concentration and recovery of waste liquid left over from a metal plating process and other treating processes.

In order to eliminate a difficult problem of the public nuisance which has been encountered with the waste liquid resulting from a chromium or cadmium plating process or other treating processes, heretofore it has been proposed to provide a method of effecting vacuum concentration and recovery of such waste liquid which results from the plating liquid in a plating tank during and after the metal plating process. In the conventional method, the liquid accompanied by plated products and discharged therewith or the liquid resulted from the plated products during washing thereof is recovered in a recovery tank, then the waste liquid thus recovered is concentrated under vacuum to remove water contained therein, and subsequently the waste liquid thus concentrated is fed back into the plating tank, whereby injurious compositions contained in the waste liquid and detrimental to operator's health are used again without discharging these injurious compositions to the outside, but discharging only harmless water to the outside. The method of effecting vacuum concentration and recovery of the waste liquid is based on such principle that the inside of an evaporating vessel subjected to vacuum is capable of sucking up the waste liquid therein and that the waste liquid heated to raise its temperature can evaporate the water content contained in the waste liquid at a lower temperature.

Conventional vacuum concentrating and recovery apparatuses as constructed on the basis of the above mentioned principle have the disadvantage that the apparatus as a whole is large in size and takes up much space for installation thereof. In addition, the conventional apparatuses are expensive in installation cost, and as a result, can be applied to large scale plating factories, but could not be applied to middle and small scale plating factories. Moreover, these conventional apparatuses are not satisfactory as means of preventing the public nuisance encountered by the waste liquid resulting from the chromium or cadmium plating process and other treating processes. In order to eliminate the public nuisance encountered by the waste liquid, it has eagerly been desired to develop a vacuum concentrating and recovery apparatus which is extremely compact in construction, highly efficient in operation and less expensive in installation cost.

An object of the invention is to provide such improved apparatus which can satisfy the above mentioned requirements.

Another object of the invention is to provide such improved apparatus which comprises an evaporating vessel, a heater and drain tanks arranged in a manner such that the supply of the waste liquid into the evaporating vessel and the discharge of the distilled water from the drain tanks are automatically effected, that the waste liquid can continuously be concentrated, and that much amount of waste liquid can efficiently be treated.

A feature of the invention is the provision of an apparatus for automatically effecting vacuum concentration and recovery of waste liquid, comprising an evaporating vessel including a heater, a steam riser tube connected to the top of said evaporating vessel, a vapor separator and a vapor condenser both incorporated into said steam riser tube, first and second drain tanks connected in series to said condenser, means for supplying in counterflow to vapor, washing water to said vapor separator and means for supplying cooling water to said vapor condenser, respectively, a vacuum pump connected through said first drain tank to said condenser and imposing a negative pressure on said condenser, a waste liquid recovery tank and a concentrated waste liquid tank each adapted to be selectively connected to said evaporating vessel, upper and lower limit relays arranged in said evaporating vessel and detect and transmit signals corresponding to the liquid levels of the waste liquid in the evaporating vessel, a relay arranged in said second drain tank detects and transmits a signal corresponding to the water level of the distilled water in the second drain tank, a relay arranged in said waste liquid recovery tank detects and transmits a signal corresponding to the liquid level of the waste liquid recovery tank, and a relay control circuit to receive a detected output signal from each of said relays and in response to the signals of said detected outputs respectively, heat the waste liquid in the evaporating vessel when it is filled with the waste liquid, discharge the distilled water in the second drain tank when it is filled with the distilled water, to supply the waste liquid from the waste liquid recovery tank into the evaporating vessel and automatically indicate in response to the amount of the waste liquid in the waste liquid recovery tank whether or not the waste liquid in the evaporating vessel is heated.

Other objects, features and advantages of the invention will become apparent from the following description when taken in conjunction with the accompanying drawings, in which:

FIG. 3 is a diagram of a relay control circuit for controlling the relays arranged in the evaporating vessel, second drain tank and waste liquid recovery tank of FIG. 1, respectively; and FIG. 4 is a time chart graphically representing the relation between the operating time and the essential parts of the apparatus according to the invention and shown in FIG. 1.

Figure 1:
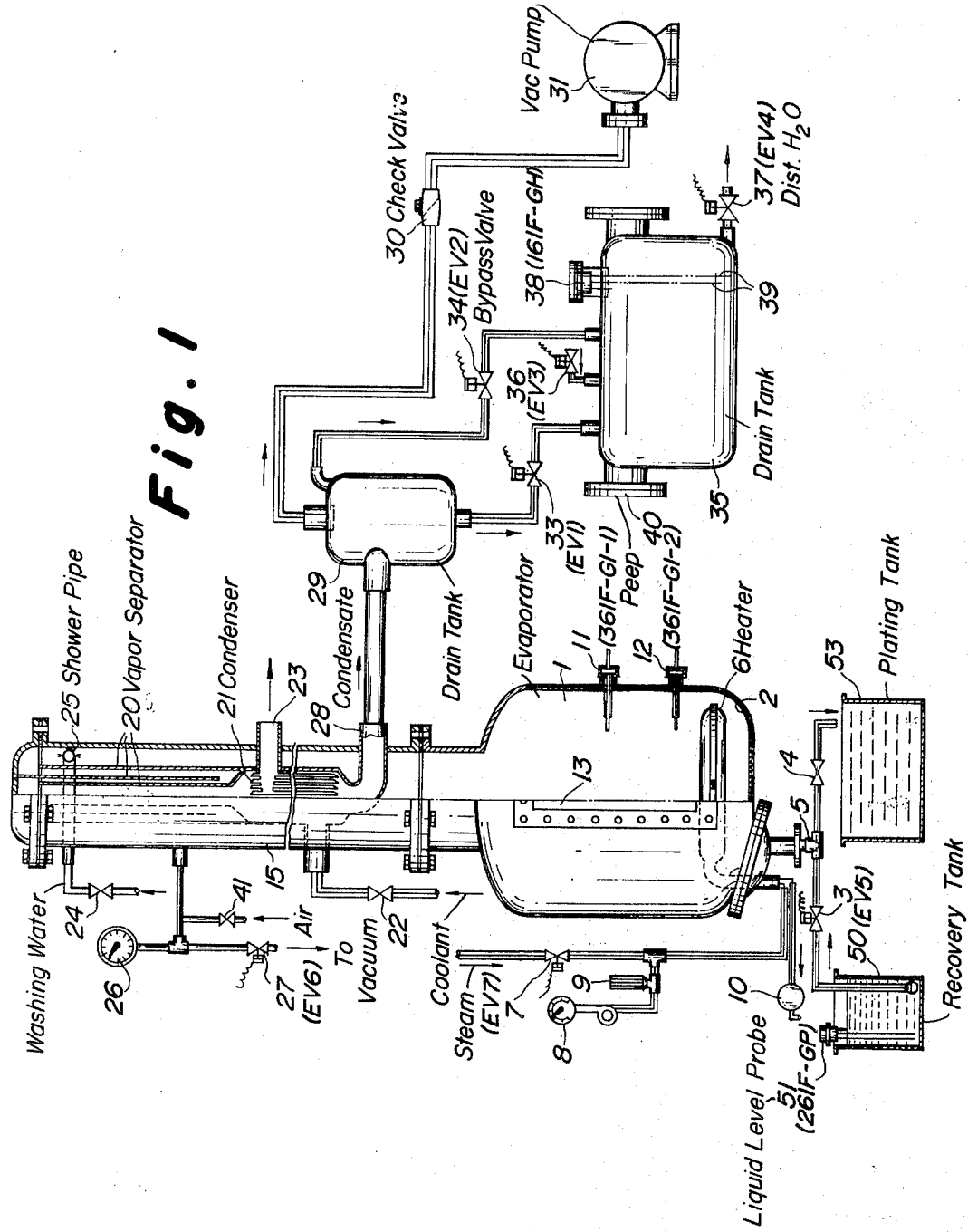
FIG. 1 is a diagrammatic view partly in section and showing construction and arrangement of essential parts of the apparatus for automatically effecting vacuum concentration and recovery of waste liquid according to the invention.

Referring to FIG. 1, reference numeral 1 designates an evaporating vessel which is large in diameter and short in length and made, for example, of 18Cr–8Ni stainless steel and is substantially cylindrical in shape. It is preferable to provide a lining 2 for the inner wall of the vessel 1 in order to make the latter anticorrosive. For this purpose, a metal material suitably selected from high grade metals such as niobium, tantalum, titanium, zirconium, etc. is extruded into a thin metal sheet having a given shape which is then folded into two sheets. These two sheets are joined together by a seam welding to form the lining 2. The lining 2 made of niobium may be used in case of using a chromium silicofluoride plating bath. 3 shows an electromagnetic valve for supplying a waste liquid into the vessel 1. In a relay control circuit to be described later and shown in FIG. 3, this electromagnetic valve is designated by EV5, 4 represents a manual outlet valve for the concentrated and recovered waste liquid and 5 a cross valve which is capable of supplying the waste liquid from a recovery tank 50 into the vessel 1 and discharging the concentrated and recovered waste liquid from the vessel 1 into a plating tank 53. In the evaporating vessel 1 is arranged an elongated heater 6 provided with fins made of niobium. Steam produced in a boiler (not shown) is supplied through an electromagnetic inlet valve 7 (EV7) into the heater 6. The heater 6 may be of an elongated construction provided with a number of fins and is compact in construction, high in circulating efficiency, highly efficient in heating when boiling the steam and less expensive. Provision is made of a steam pressure gauge 8 and a safety valve 9 arranged on that portion of the tubing which extends from the steam inlet valve 7 to the heater 6. The stem in the heater 6 is discharged through a steam trap 10 into the outside. The evaporating vessel 1 is provided at its upper and lower side walls with upper and lower side sensitive rods 11 and 12, respectively, each projected into the vessel 1 and controlling the liquid level therein. Each of these sensitive rods 11, 12 constitutes a part of a liquid level relay 361F–G1. 13 designates a peep window for the evaporating vessel 1.

Figure 2:
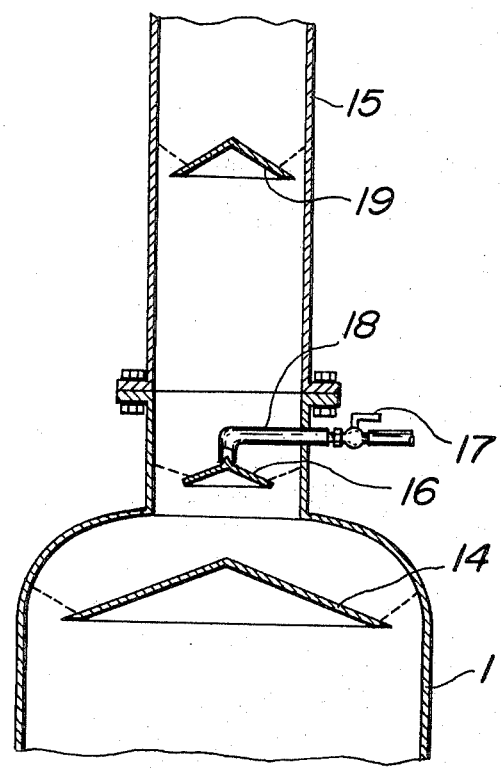
FIG. 2 is a detailed cross-sectional view showing the evaporating vessel and the steam riser tube of FIG. 1.

As shown in FIG. 2, the evaporating vessel 1 is provided therein with a conical antiwave plate 14 which is suspended by means of reinforcing members shown by dotted lines. On the top of the evaporating vessel 1 is vertically mounted a steam riser tube 15 which is relatively small in diameter and made, for example, of 18Cr–8Ni stainless steel. The steam rising up tube 15 is provided near its base with a bubble eliminator arranged above the antiwave plate 14. This bubble eliminator comprises a conical bubble eliminating plate 16 which is suspended by means of reinforcing members shown by dotted lines from the inner wall of the steam rising up tube 15. The bubble eliminating plate 16 may be provided at its center top portion with a projection, if desired. To such projected top of the plate 16 is blown air fed from an air pipe 18 through an air cock 17 in a manner such that the bubbles violently produced during vacuum evaporation and boiling of the waste liquid in the evaporating vessel are eliminated to completely separate the vapor from the waste liquid. Above the bubble eliminating plate 16 is arranged a splash guard plate 19 as shown in FIG. 2 which can prevent the splash rising up in mist state from rising further.

The steam riser tube 15 may be mounted on the evaporating vessel 1 eccentrically from its center axis. In such case, the ceiling at the top of the evaporating vessel 1 may also be used as the antiwave plate.

In the steam riser tube 15 is arranged vapor separating cylinders 20 above the splash guard plate 19. The vapor separating cylinders 20 are provided at the bottom thereof with a condenser 21 which may preferably be in the form of a root heat exchanger. Cooling water is supplied through an inlet valve 22 into the root heat exchanger 21 from which is then discharged through an outlet 23 into the outside. Reference numeral 24 designates an inlet valve through which is supplied in counterflow washing water, 25 a shower pipe for spraying in counterflow the washing water, 27 (EV6) an electromagnetic valve through which is imposed vacuum to the inside of the evaporating vessel 1, and 41 a manual valve through which is supplied air into the steam riser tube 15. The condensate from the condenser 21 is supplied through the outlet 28 into a first drain tank 29.

As seen from the above, the invention provides the evaporating vessel 1 which is large in diameter and short in length and which is provided therein with the antiwave plate 14 and on top thereof with the steam riser tube 15 arranged preferably eccentrically from the center axis of the vessel 1. Thus, the invention is capable of preventing splash resulting from the violent bubbling during the boiling of the waste liquid. In addition, the steam rising up tube 15 is made relatively small in diameter and hence in volume, and as a result, the vacuum subjected to the tube 15 becomes efficient in operation, thereby decreasing the load subjected to a vacuum pump 31 to be described later. In addition, the condenser 21 is incorporated into the steam riser tube 15 so that the space in the tube is not vacant. As a result, the inner volume of the tube 15 which must be subjected to vacuum can be decreased and the vacuum subjected to the tube 15 becomes efficient in operation, thereby decreasing the load subjected to the vacuum pump 31.

To the first drain tank 29 is connected through a vacuum check valve 30 the vacuum pump 31 which serves to supply the distilled water from the condenser 21 into the first drain tank 29 under vacuum. 33 shows a vacuum cut-off main electromagnetic valve (EV1) and 34 a vacuum cut-off by-passing electromagnetic valve (EV2). The first drain tank 29 is connected through these valves 33 and 34 to a second drain tank 35. 36 (EV3) designates an electromagnetic valve for supplying air into the second drain tank 35 and 37 (EV4) an electromagnetic valve for discharging the distilled water from the second drain tank 35 into the outside. 38 (161F–GH) designates a distilled water level relay provided with a sensitive rod 39. Reference numeral 40 designates a peep window for the second drain tank 35.

As seen from the above, the invention provides a drain tank which is operable as a drain reservoir and consists of an upper and lower tanks, the upper tank being the first drain tank 29 and the lower tank being the second drain tank 35. During the automatic discharge of the distilled water from the second drain tank 35, the distilled water is accumulated in the upper first drain tank 29, and as a result, the waste liquid concentrating and recovery treatments can continuously be effected.

Figure 3:
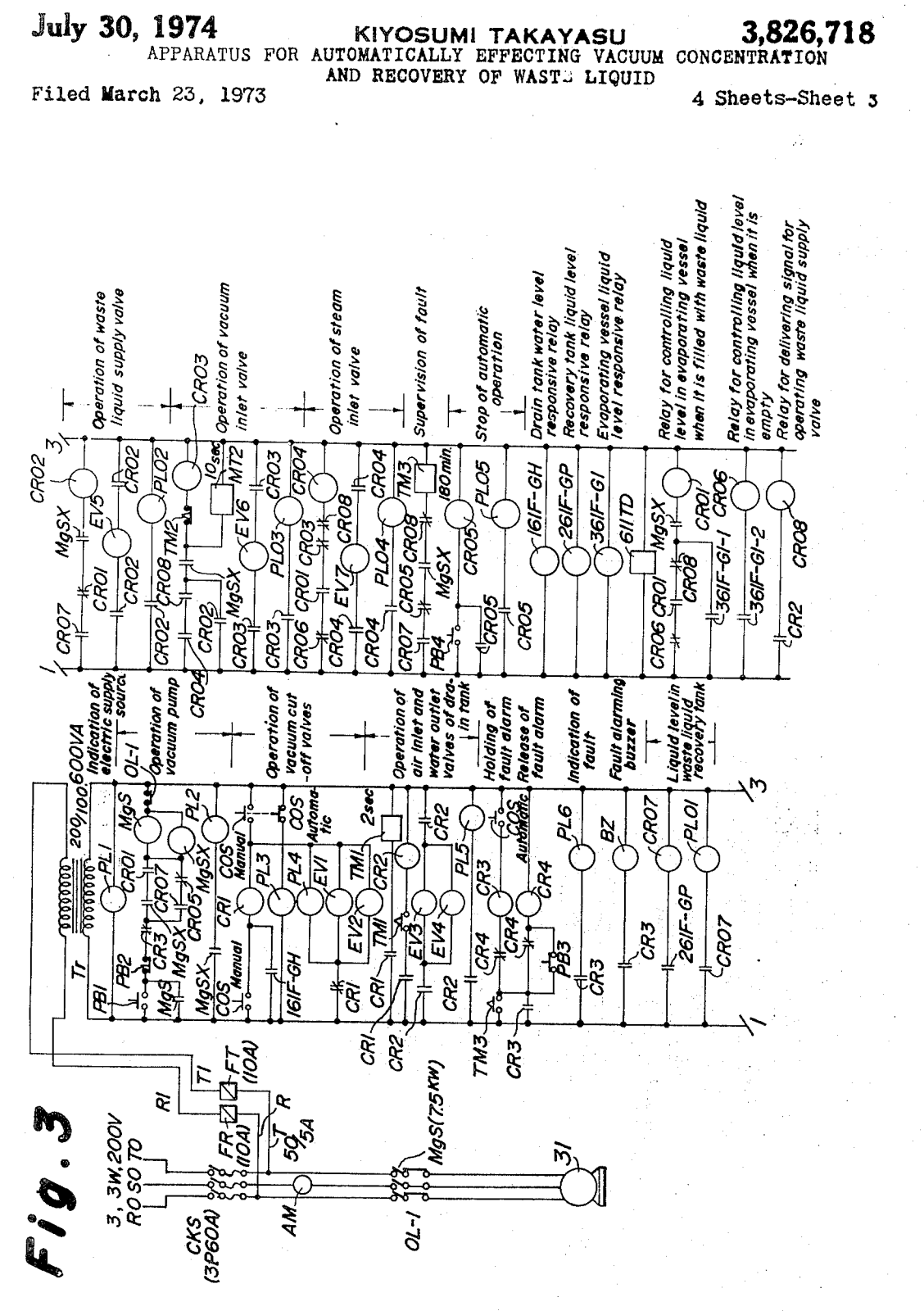

In addition, the invention makes use of a control board on which is arranged a relay control circuit shown in FIG. 3 and for automatically effecting waste liquid concentrating and recovery treatments in sequence. As a result, even though use is made of the evaporating vessel 1 which is small in size, it is possible to treat a large amount of waste liquid by increasing the capacity of the heater 6, condenser 21 and vacuum pump 31, etc. and hence shorten the treating time.

One embodiment of the relay control circuit according to the invention which is capable of automatically effecting the above mentioned waste liquid concentrating and recovery treatments in sequence will be described with reference to FIG. 3. In the present embodiment, the discharge of the distilled water from the second drain tank into the outside, the supply of the waste liquid into the evaporating vessel and the concentration of the waste liquid in the evaporating vessel are automatically controlled in sequence by means of the relay control circuit on the control board, and only the discharge of the concentrated waste liquid from the evaporating vessel is manually controlled.

The relay control circuit on the control board shown in FIG. 3 comprises the following circuit elements:

| | |
|---|---|
| CKS | Main switch for electric supply source. |
| AM | Ammeter. |
| FR, FT | Fuses. |
| MgS | Electromagnetic switch for vacuum pump. |
| MgSX | Auxiliary relay for vacuum pump. |
| EV1 | Vacuum cut-off main electromagnetic valve. |
| EV2 | Vacuum cut-off by-passing electromagnetic valve. |
| EV3 | Air inlet electromagnetic valve for second drain tank. |
| EV4 | Distilled water outlet electromagnetic valve for second drain tank. |
| EV5 | Waste liquid supply electromagnetic valve. |
| EV6 | Vacuum inlet electromagnetic valve. |
| EV7 | Steam inlet electromagnetic valve. |
| CR1 | Relay for vacuum cut-off valves. |
| CR2 | Relay for air supply and distilled water discharge valves. |
| CR3 | Relay for holding fault alarm. |
| CR4 | Relay for releasing fault alarm. |
| CR01 | Relay for controlling liquid level in evaporating vessel. |
| CR02 | Relay for operating waste liquid supply valve. |
| CR03 | Relay for operating vacuum inlet valve. |
| CR04 | Relay for operating steam inlet valve. |
| CR05 | Relay for stopping automatic operation after completion of evaporating stroke. |
| CR06 | Relay for controlling liquid level in evaporating vessel when it is empty. |
| CR07 | Relay for controlling liquid level in recovery tank. |
| CR08 | Relay for delivering signal for supplying waste liquid. |
| PB1 | Push button switch for energizing vacuum pump. |
| PB2 | Push button switch for deenergizing vacuum pump. |
| PB3 | Push button switch for releasing fault alarm. |
| PB4 | Push button switch for stopping automatic operation after completion of evaporating stroke. |
| COS | Switch for controlling change-over between "manual operation"—"interruption"—"automatic operation" of concentrating operation. |
| 161F-GH | Relay for water level in second drain tank. |
| 261F-GP | Relay for liquid level in recovery tank. |
| 361F-GL | Relay for liquid level in evaporating vessel. |
| 611TD | Timer for controlling liquid level in second drain tank. |
| TM1 | Timer for measuring time from vacuum cut-off to operation of air supply valve and distilled water discharge valve (2 seconds). |
| TM2 | Timer for operating vacuum inlet valve (10 seconds). |
| TM3 | Timer sensitive to delay of evaporating stroke (180 minutes). |
| PL1 | Pilot lamp for indicating electric supply source. |
| PL2 | Pilot lamp for indicating operation of vacuum pump. |
| PL3 | Pilot lamp for indicating concentrating operation. |
| PL4 | Pilot lamp for indicating operation of vacuum cut-off valves. |
| PL5 | Pilot lamp for indicating operation of air supply valve and distilled water discharge valve at second drain tank. |
| PL6 | Pilot lamp for indicating fault. |
| PL01 | Pilot lamp for indicating liquid level in recovery tank. |
| PL02 | Pilot lamp for indicating operation of waste liquid supply valve. |
| PL03 | Pilot lamp for indicating operation of vacuum inlet valve. |
| PL04 | Pilot lamp for indicating operation of steam supply valve. |
| PL05 | Pilot lamp for indicating stop of automatic operation after completion of evaporating stroke. |
| BZ | Fault alarming buzzer. |

The control operation in sequence of the apparatus according to the invention shown in FIG. 1 will be described with reference to FIGS. 3 and 4.

(1) The cooling water inlet valve 22, valve for supplying water into a supplementary water tank and overflow valve are manually opened and the circulation of the cooling water is confirmed beforehand. Each of these valves remains opened until the waste liquid recovery operation is completed.

(2) The main switch for electric supply source CKS on the control board is closed to change-over the control switch COS from "manual" position to "automatic" position. As a result, the electromagnetic valves EV1 and EV2 are energized to open both vacuum cut-off main valve 33 and vacuum cut-off by-passing valve 34. The liquid level relay 51 (261F-GP) for the waste liquid recovery tank 50 adapted to be energized when the liquid level in the recovery tank 50 is higher than a given level becomes operated to energize the relay CR07. The following sequence of operations are carried out when the relay CR07 is operated, and as a result, the operation of the relay CR07 makes it possible to confirm that the liquid level in the recovery tank 50 is higher than the given level.

Then, the push button switch PB1 is pushed to energize the auxiliary relay MgSX and the push button switch PB1 is held in its closed position. This auxiliary relay MgSX causes the electromagnetic switch MgS to be closed to start the vacuum pump 31. At the same time, the auxiliary relay MgSX causes the relay CR02 to be energized to energize the electromagnetic valve EV5. As a result, the electromagnetic valve EV5, that is, the electromagnetic valve 3 shown in FIG. 1 becomes opened to supply the waste liquid to be recovered through the cross valve 5 into the evaporating vessel 1. The operation of the relay CR02 causes the relay CR03 to be energized to open the electromagnetic valve EV6, that is, open the vacuum inlet electromagnetic valve 27. As a result, the waste liquid in the evaporating vessel 1 is subjected to vacuum applied through the electromagnetic valve 27 and hence sucked up and fed into the riser tube 15. When the level of the waste liquid in the evaporating vessel 1 reaches to that position at which is located the liquid level sensitive rod 11, the contacts 361F-G1-1 of the relay 361F-G1 are closed to energize the relay CR01 which is then held in its energized position so as to signify that the evaporating vessel 1 is filled with the waste liquid. The operation of the relay CR02 causes a counting operation of the timer TM2. After an elapse of time, for example, 10 seconds, the normally closed contacts of the timer TM2 are opened to deenergize the relay CR03. As a result, the vacuum inlet electromagnetic valve EV6 opens for 10 seconds during which the inside of the evaporating vessel 1 is kept under vacuum.

(3) As the relay CR01 is energized, the relay CR02 is deenergized to close the electromagnetic valve EV5 so as to stop the supply of waste liquid into the evaporating vessel 1 on the one hand, whilst the timer TM2 is capable of deenergizing the relay CR03 and energizing the relay CR04 on the other hand. The energization of the relay CR04 causes the steam inlet electromagnetic valve 7 to be opened. That is, the steam inlet electromagnetic valve 7 shown in FIG. 1 becomes opened to supply steam to the heater 6 and hence heat the waste liquid in the evaporating vessel 1. The steam evaporated in the evaporating vessel 1 rises up into the steam riser tube 15 and is cooled through the vapor separating cylinders 20 by means of the condenser 21. As stated in the paragraph (1), the condenser 21 is supplied through the inlet valve 22 with the cooling water which circulates through the condenser 21. The steam produced in the condenser 21 is supplied from its outlet 28 into the first drain tank 29 by means of the vacuum pump 31. The distilled water in the first drain tank 29 is supplied through the open electromagnetic valves 33 and 34 into the second drain tank 35 where the distilled water is accumulated. In this case, the electromagnetic valve EV4, that is, the electromagnetic valve for discharging the distilled water 37 is closed.

(4) As the waste liquid in the evaporating vessel 1 is heated by the heater 6 and evaporated, the liquid level of the waste liquid lowers to that position at which is located the sensitive rod 12. Then, the contacts 361F-G1-2 of the liquid level relay 361F-G1 are closed to energize the relay CR06. As a result, the relay CR04 is deenergized to close the electromagnetic valve EV7, thereby stopping the supply of steam into the evaporating vessel 1.

(5) When the liquid level of the distilled water accumulated in the second drain tank 35 reaches up to the level of the liquid level relay 38 (161F-GH) arranged in the second drain tank 35, the contacts 161F-GH of the liquid level relay 38 are closed to energize the relay CR1 and hence deenergize the electromagnetic valves EV1 and EV2. That is, the electromagnetic valves 33 and 34 are closed to stop the supply of the distilled water from the first drain tank 29 into the second drain tank 35, and hence the distilled water is accumulated in the first drain tank 29. At the same time, the relay CR1 causes the timer TM1 to be energized to operate it after an elapse of time, for example 2 seconds. The output from the timer TM1 causes the relay CR2 to be energized after a time lag. The relay CR2 is capable of energizing the electromagnetic valves EV3 and EV4. That is, the air inlet electromagnetic valve 36 becomes opened to supply air into the second drain tank 35, whilst the distilled water outlet electromagnetic valve 37 becomes opened to discharge the distilled water out of the second drain tank 35.

As the distilled water is discharged out of the second drain tank 35, the water level thereof becomes lowered to a given level at which level are opened the contacts 161F–GH of the liquid level relay 161F–GH to deenergize the relay CR1. As a result, the electromagnetic valves EV1 and EV2 are energized and hence become opened, whilst the electromagnetic valves EV3 and EV4 are deenergized and hence become closed.

(6) In addition, as the second drain tank 35 is filled with distilled water to operate the relay CR1 and then operate the relay CR2 after the elapse of time limit of the timer TM1, the relay CRO8 is also energized to release the self-holding position of the relays CRO1 and CRO3. Through the normally closed contacts of the relay CRO1 is energized again the relay CRO2 to open the electromagnetic valves EV5 and EV6. Thus, as described in the above paragraph (2), the waste liquid in the tank 50 is supplied into the evaporating vessel 1. From this time forward, the same steps as those mentioned above are effected to automatically repeat the concentration of the waste liquid and the discharge of the distilled water.

(7) When the waste liquid in the evaporating vessel 1 is concentrated and the liquid level arrives at a level which is lower than that level at which is located the sensitive rod 12, the contacts 361F–G1-2 of the relay 361F–G1 are closed to energize the relay CRO6, thereby indicating that the waste liquid in the evaporating vessel 1 is exhausted. Then, the relay CRO4 is deenergized to close the electromagnetic valve EV7 and hence stop the supply of steam into the evaporating vessel 1. At the same time, the relays CRO2 and CRO3 are energized to open the electromagnetic valves EV5 and EV6, thereby starting the supply of waste liquid into the evaporating vessel 1 and starting the supply of vacuum into the steam rising up tube 15, respectively. That is, in FIG. 4 only the relays CRO2, CRO3 and CRO4 are brought back into the point A to repeat the steps as described in the paragraphs (2) to (6) to continue the waste liquid concentrating operation.

(8) When the waste liquid in the evaporation vessel 1 becomes exhausted and the waste liquid in the recovery tank 5 is not sufficient, the contacts 261F–GP of the recovery tank liquid level relay 51 become opened. But, the relay CRO7 is in its deenergized condition so that as the liquid level in the evaporating vessel 1 lowers due to evaporation from the sensitive rod 11 to the sensitive rod 12, the relays CRO2, CRO3, CRO4 and MgSX are deenergized to open the electromagnetic valves EV5, EV6, EV7 and the electromagnetic switch MgS whereby the vacuum pump 31 is stopped.

As the liquid level in the recovery tank 50 rises, the liquid level relay 51 becomes operated to close its contacts 261F–GP. If the relay CRO7 is energized, the electromagnetic valves EV5, EV6, EV7, the electromagnetic switch MgS and the vacuum pump 31 become operated again.

(9) During the sequence control described in the paragraphs (2) to (6), if both the relays CRO7 and MgSX are operating and the non-operative condition of both the relays CRO5 and CRO8 continue for a given time, for example 180 minutes, the timer TM3 becomes operated to energize the relay CR3. Thus, the pilot lamp PL6 indicates the fault and the buzzer BZ alarms the presence of the fault. The relay CR3 is held in its energized condition so that the alarms issued from the pilot lamp PL6 and buzzer BZ continue until the push button switch PB3 is pushed to deenergize the relay CR3 by means of the relay CR4.

(10) After the concentrating operations have been repeated for a given number of times, the push button switch PB2 is pushed to open the electromagnetic switch MgS and hence stop the vacuum pump 31. Then, the air inlet manual valve 41 is opened to make the negative pressure in the evaporating vessel 1 zero. Then, the concentrated waste liquid outlet manual valve 4 is opened to discharge the concentrated waste liquid from the evaporating vessel 1 into the plating tank 53. After the completion of supply of the concentrated waste liquid from the evaporating vessel 1 into the plating tank 53, the manual valve 4 is closed to start again the concentrating operations described in the paragraphs (2) to (6).

(11) After the completion of concentration and recovery of the waste liquid, the operation described in the paragraph (10) is manually effected. Then, the main electric supply source switch CKS is opened to close the water supply valve and overflow valve of the supplementary water tank. When the automatic operation is stopped, the push button switch PB4 is pushed to operate the relay CRO5 and hence deenergize the relay MgSX, thereby interrupting all of the succeeding sequence of operations.

As stated hereinbefore, the invention provides such an apparatus on a small scale enabling not only a supply of the waste liquid from its reservoir to the evaporating vessel and a discharge of the distilled water from the drain tank to be automatically and continuously obtained, but also concentration and recovery of much amount of waste liquid to be efficiently obtained. Thus, the apparatus according to the invention is simple in construction and less expensive and may easily be installed in large scale plating factories as well as in middle and small scale plating factories. Therefore, the invention contributes greatly to the plating industry wherein the public nuisance encountered by the waste liquid is liable to be occurred.

The apparatus according to the invention comprises a splash separator and a condenser both incorporated into a steam rising up tube mounted on the top of an evaporating vessel and hence is capable of minimizing the space which must be subjected to vacuum and hence vacuum can efficiently be utilized. Thus, the apparatus according to the invention makes it possible to use a vacuum pump small in size. In addition, the presence of two drain tanks connected in series in accordance with the invention permits the distilled water to be accumulated in the first drain tank whilst the distilled water in the second drain tank is discharged into outside, thereby continuously heating and concentrating the waste liquid in the evaporating vessel without interrupting these operations.

In addition, the invention is capable of automatically progressing the concentrating operation and hence of shortening the time required for treating much amount of waste liquid.

Moreover, the apparatus according to the invention can automatically be operated without requiring any attendance of a number of operators. Attendance of the operator is only required when the automatic operation becomes abnormal which is then alarmed or when the operations as described in the paragraphs (10) and (11) are to be carried out. Thus, the invention provides a material decrease in manual operations.

In addition, the provision of the antiwave plate arranged in the evaporating vessel and of the bubble eliminator and splash guard plate arranged in the steam riser tube in accordance with the invention results in that the bubbles and splashes produced when the waste liquid is boiling in the evaporating vessel are prevented from being risen up to the condenser and from being mixed with the distilled water.

The embodiment of the invention shown in the drawings is for the purpose of describing the objects and features of the present invention. It is to be understood, however, that modifications, changes and alternations may be made without departing from the scope and spirit of the invention.

What is claimed is:

1. An apparatus for automatically effecting vacuum concentration and recovery of waste liquid, comprising an evaporating vessel including a heater, a steam riser tube connected to the top of said evaporating vessel, a vapor separator and a vapor condenser both incorporated into said steam riser tube, first and second drain tanks connected in series to said condenser, means for supplying in counterflow to vapor, washing water to said vapor separator and means for supplying cooling water to said condenser, respectively, a vacuum pump connected through said first drain tank to said condenser and imposing a negative pressure on said condenser, a waste liquid recovery tank and a concentrated waste liquid tank each adapted to be selectively connected to said evaporating vessel, upper and lower limit relays arranged in said evaporating vessel detecting and transmitting signals corresponding to the liquid levels of the waste liquid in the evaporating vessel, a relay arranged in said second drain tank detecting and transmitting a signal corresponding to the water level of the distilled water in the second drain tank, a relay arranged in said waste liquid recovery tank detecting and transmitting a signal corresponding to the liquid level of the waste liquid recovery tank, and a relay control circuit to receive a detected output signal from each of said relays and in response to the signals of said detected outputs respectively, to heat the waste liquid in the evaporating vessel when it is filled with the waste liquid, discharge the distilled water in the second drain tank when it is filled with the distilled water, supply the waste liquid from the waste liquid recovery tank into the evaporating vessel and automatically indicate in response to the amount of waste liquid in the waste liquid recovery tank whether or not the waste liquid in the evaporating vessel is heated.

References Cited

UNITED STATES PATENTS

| | | | |
|---|---|---|---|
| 3,220,883 | 11/1965 | Howard | 127—16 |
| 3,341,429 | 9/1967 | Fondrk | 202—185 X |
| 3,542,651 | 11/1970 | Yagishita | 202—169 |
| 3,503,433 | 3/1970 | Riva et al. | 159—44 |
| 3,616,437 | 10/1971 | Yagishita | 159—23 |
| 3,640,331 | 2/1972 | Yagishita | 159—23 |
| 3,658,470 | 4/1972 | Zievers et al. | 23—145 |

FOREIGN PATENTS

| | | | |
|---|---|---|---|
| 415,524 | 6/1925 | Germany | 202—185 |

JACK T. SOFER, Primary Examiner

U.S. Cl. X.R.

159—44, 43 A; 202—185, 189, 196, 197; 203—2; 204—232, 237